Nov. 17, 1970   W. E. KOLLEK ET AL   3,540,253
ROLL CHANGERS
Filed Oct. 30, 1967   8 Sheets-Sheet 1

INVENTORS
Werner E. Kollek.
William J. Korey.
BY
Their Attorneys

Nov. 17, 1970  W. E. KOLLEK ET AL  3,540,253
ROLL CHANGERS
Filed Oct. 30, 1967  8 Sheets-Sheet 3

INVENTORS
Werner E. Kollek.
William J. Korey.
BY
Their Attorneys

INVENTORS
Werner E. Kollek.
William J. Korey.

INVENTORS
Werner E. Kollek.
William J. Korey.

Fig.18.

United States Patent Office 3,540,253
Patented Nov. 17, 1970

3,540,253
ROLL CHANGERS
Werner E. Kollek and William J. Korey, Pittsburgh, Pa., assignors to Blaw-Knox Company, Pittsburgh, Pa., a corporation of Delaware
Filed Oct. 30, 1967, Ser. No. 679,105
Int. Cl. B21b *31/10*
U.S. Cl. 72—239       18 Claims

ABSTRACT OF THE DISCLOSURE

This invention relates to roll changers for mills having superimposed work rolls in a mill housing. The invention comprises a removable roll transfer bridge adjacent the mill housing having rails onto which the work rolls may be withdrawn from the mill housing by means of a pullback rod and latch member moving in guides on the transfer bridge. The latch member is provided with an articulate end portion which is raised and lowered by articulate segments of the guides on the transfer bridge into and out of engagement with the work rolls by means of hydraulic cylinders.

In a preferred form of the invention, a side shift car is provided adjacent the transfer bridge having two or more sets of rails adapted to be selectively aligned with the rails on the transfer bridge to receive and discharge work rolls onto and off of rails on the transfer bridge and having guide means between each set of rails to carry the pullback rod and latch member.

---

This invention relates to roll changers and particularly to hot strip mill automatic work roll changers.

The problem of changing work rolls in steel rolling mills has been a matter of increasing importance if not criticality in the efficient operation of modern rolling mills. With modern high speed rolling mills it is frequently necessary to change work rolls each shift or even midway between shifts because of changing nature of orders available, because of steel analysis, or for any of a variety of reasons all recognized in the trade. In the past, rolls were changed by overhead cranes using counterweighted yokes or cradles or some other device for individually handling a roll into and out of a rolling mill housing. Such methods as were heretofore available were excessively wasteful of time and manpower. With such methods, more time could be spent in changing rolls than in actual rolling using modern high speed mills. Attempts have been made to eliminate this lost time and expense with more or less success. However, all such attempts known to us have lacked the complete flexibility and efficiency which high speed mills require in order to utilize their potential to the maximum degree.

We have invented a work roll changing apparatus which eliminates the problems of the prior art and provides means for rapid roll changing with great efficiency and with the minimum of danger to workmen at the scene. Preferably we provide in a rolling mill having a mill housing surrounding a pass line, a window in each end of the housing on opposite sides of the pass line, each window receiving a pair of superimposed roll chocks having work rolls journalled therein, the improvement comprising a pair of spaced rails in said windows extending from one end of the housing to the other, means to raise and lower said rails, wheel means on the roll chocks bearing on said spaced rails to carry the rolls into and out of the housing, a roll transfer bridge adjacent the housing, spaced rails on said bridge in alignment with the rails in said housing, a side shift car at the end of said bridge opposite the housing, said side shift car having a plurality of side-by-side sets of spaced rails, each set capable of selective alignment with said bridge rails, means for moving said side shift car parallel to the mill pass line, stop means selectively positioning said car on said rails at the mill housing window, guide means on each of said bridge and said car, a floor housing guide means adjacent said car opposite the bridge and in permanent alignment with the guide means on the bridge, a pull rod movable in said guide means, a vertically movable end latch articulated on the end of said pull rod and adapted to move in said guide means with said pull rod, a vertically moving end portion on the transfer bridge guide means adjacent the mill housing, a vertically movable end portion on the end of the floor housing guide means adjacent the shift car, means at each of the said vertically movable end portions for moving said portions vertically, said end portions engaging the end latch to raise and lower it selectively into and out of engagement with a set of rolls to be changed, and means for moving said pull rod transversely to the mill pass line. Preferably, the vertically movable end guide portions are pivotally mounted on the main guide portion and rotatable thereon by means of hydraulic cylinders. In a preferred embodiment the end latch means is slidably journalled in the end of the pull rod and is provided with wheels engaged in the guide means.

In the foregoing general description of our invention we have set out certain objects, purposes and advantages of our invention. Other objects, purposes and advantages of will be apparent from the following description and the accompanying drawings in which:

Figures 1, 7, 15:
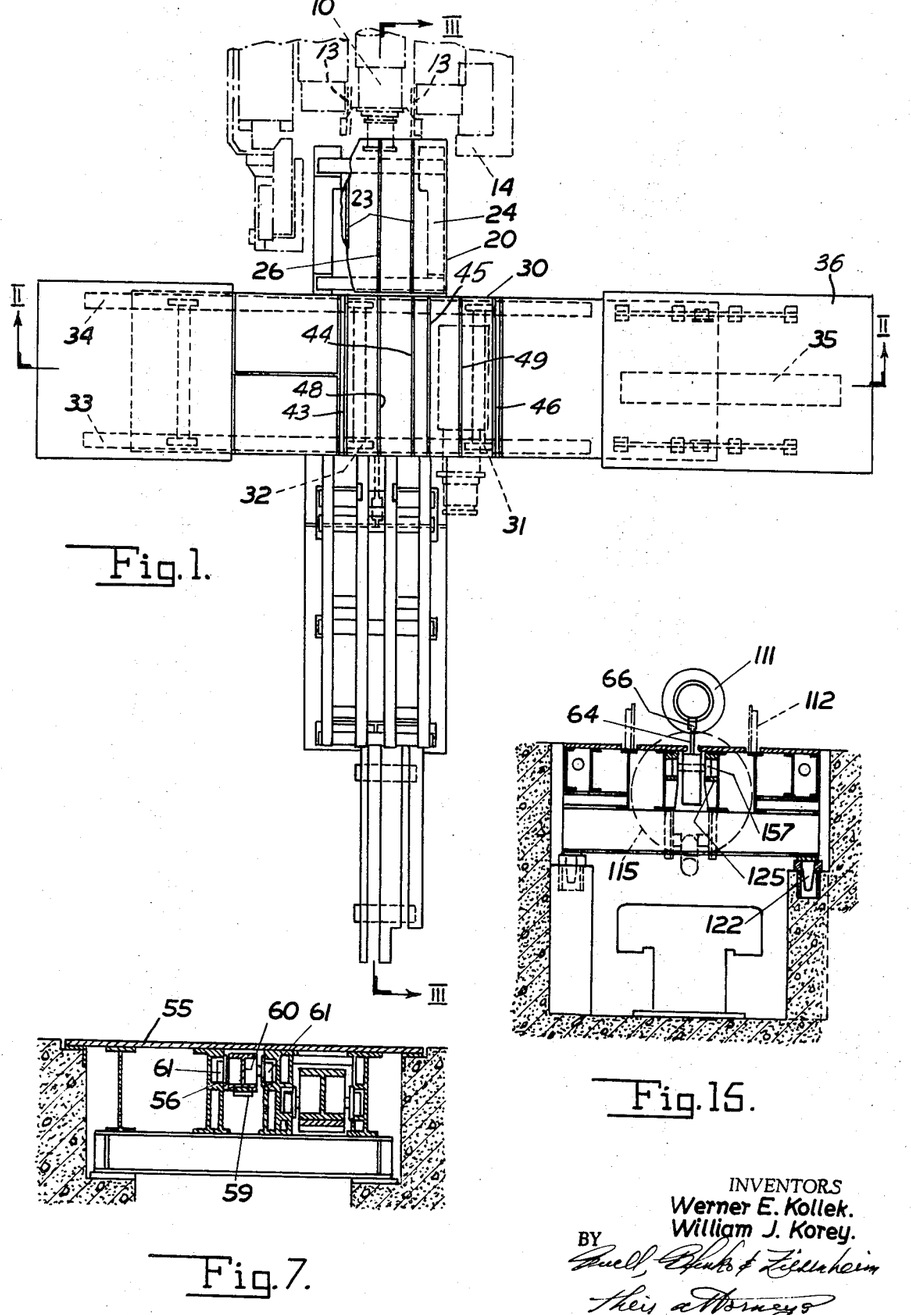
FIG. 1 is a top plan view of a rolling mill stand and roll changing rig according to our invention.
FIG. 7 is a section on the line VII—VII of FIG. 5.
FIG. 15 is a section on the line XV—XV of FIG. 13.
Figure 3:
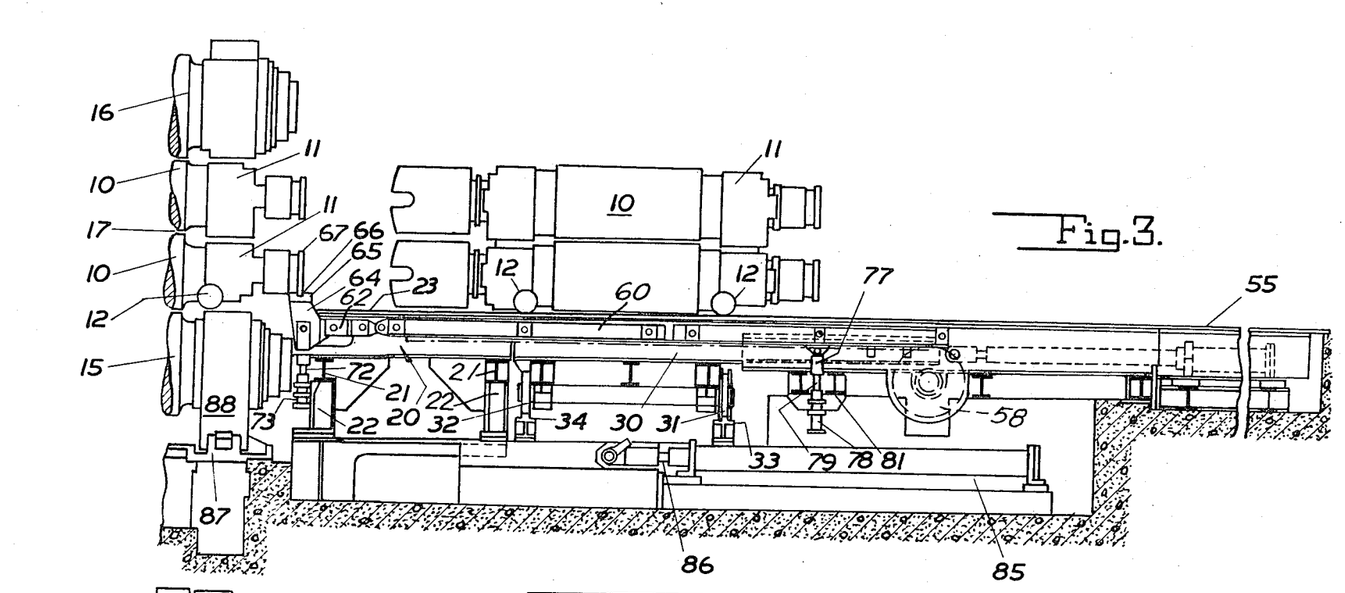
FIG. 3 is a section on the line III—III of FIG. 1.

Referring particularly to FIGS. 1 and 3 of the drawings we have illustrated a pair of work rolls 10 journalled in chocks 11 mounted on wheels 12 resting on rails 13 in mill housing 14. The rails 13 may be raised and lowered in the housing to lift the work rolls 10 off the bottom back up roll 15 by any suitable means such as hydraulic cylinders in the housing (not shown). The upper back up roll 16 may be raised and lowered to clear the work rolls by means of the screw downs (not shown) which are conventional on such mills. The work rolls in the housing form a pass line 17 on which material to be rolled moves through the mill.

A removable roll transfer bridge 20 having depending legs 21 (FIG. 3) adapted to engage vertical dowels 22 is provided adjacent the housing 14. Rails 23 on the bridge floor 24 are in alignment with the elevated position of rails 13 in the housing. Centered between the rails 13 and beneath floor 24 are spaced pullback guide rails 25 (FIG. 4) on either side of a slot 26 in floor 24. The length of bridge 20 is slightly greater than the overall length of the work roll assembly. The bridge may be removed and replaced from dowels 22 by lifting it vertically by means of an overhead crane or the like.

Figure 2:
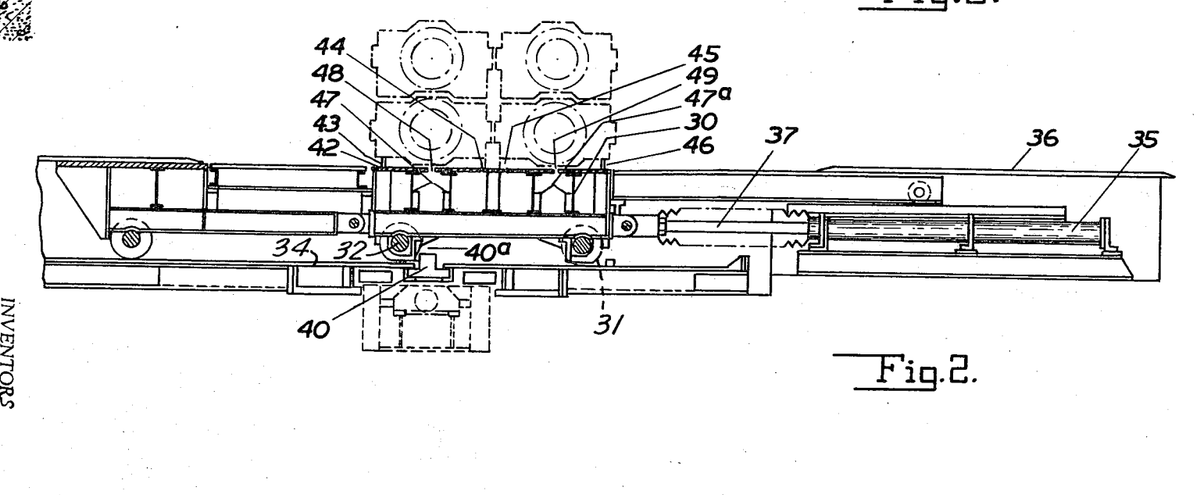
FIG. 2 is a section on the line II—II of FIG. 1.
Figure 10:
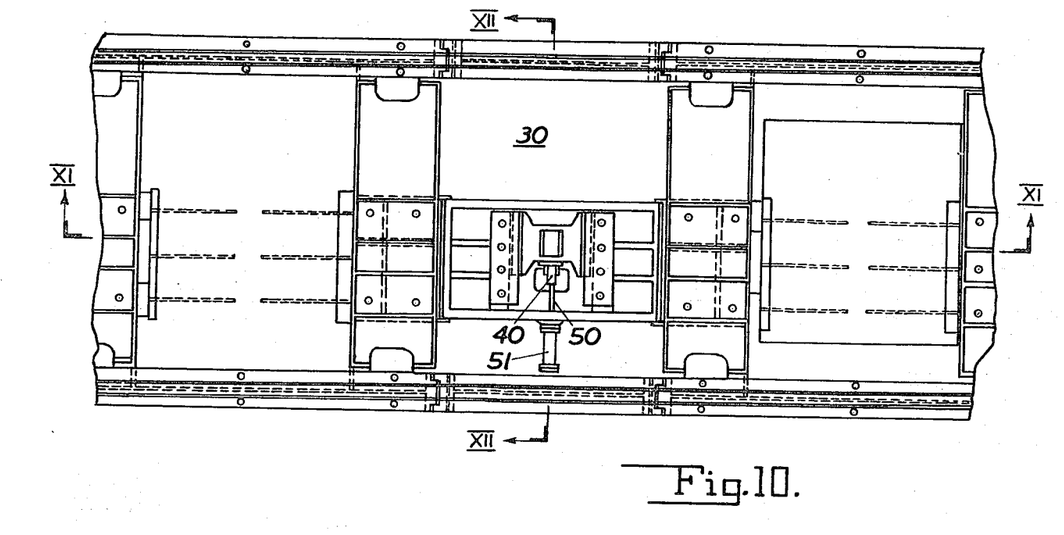
FIG. 10 is an enlarged fragmentary top plan view of the stop and pull rod mechanism for the side shift car of FIG. 1.
Figure 11:
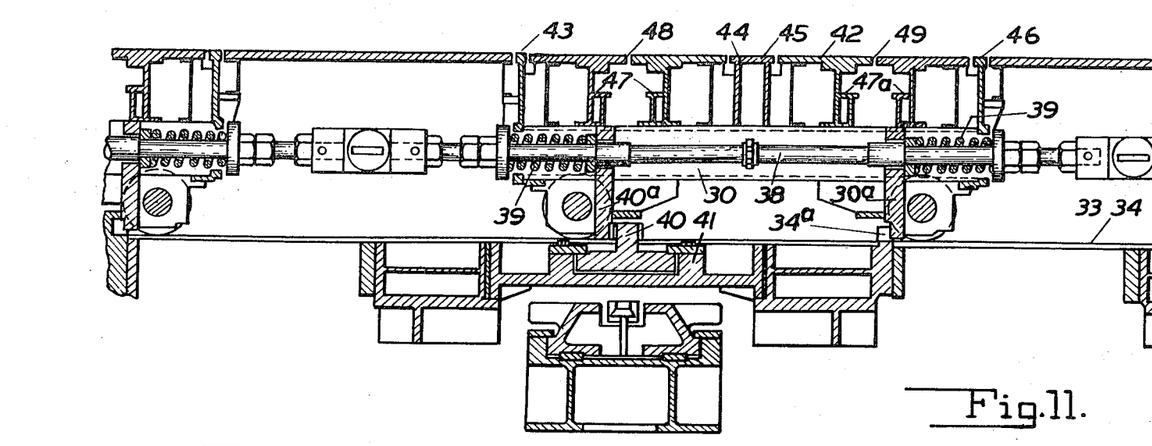
FIG. 11 is a section on the line XI—XI of FIG. 10.
Figure 12:
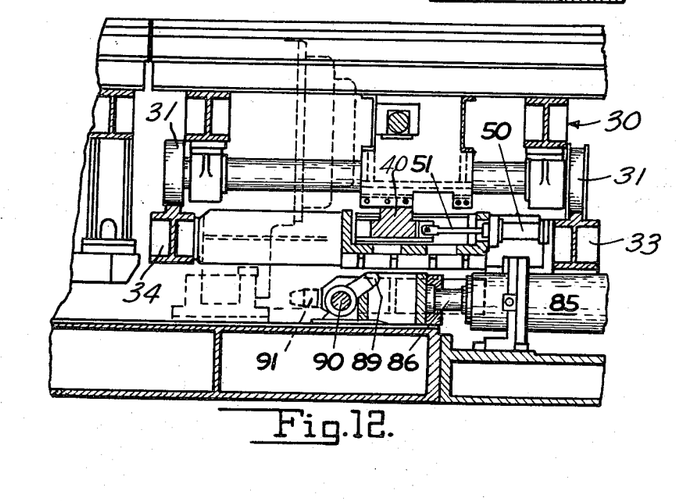
FIG. 12 is a section on the line XII—XII of FIG. 10.

Spaced from mill housing 14 by bridge 20 is side shift car 30. The side shift car 30 is mounted on spaced apart wheels 31 and 32 moving on rails 33 and 34 parallel to the mill pass line (FIGS. 1–3). One of the wheels 31 and 32 is preferably flanged on both sides while the other is unflanged. A double acting hydraulic cylinder 35 (FIGS. 1 and 2) beneath the mill floor 36 is provided with piston 37 connected at its free end to shift rod 38 in the side shift car to move it on rails 33 and 34 as shown in FIG. 11. The shift rod 38 is provided with centering springs 39 at each end. A fixed stop 34a is provided between rails 33 and 34 in the path of a fixed stop leg 30a on the bottom of shift car 30. A movable stop 40 is provided in guides 41 between rails 33 and 34. The stop 40 is adapted to be moved transversely to rails 33 and 34 from a position engageable by depending stop legs 40a on the shift car 30 to a position clear of the stop legs 40a. Movement of the movable stop 40 into engagement with leg 40a locks the car 30 in position. The side shift car 30 is provided with a top plate 42 having two pairs of spaced rails 43–44 and 45–46, one pair adapted to be in alignment with rails 23 on the transfer bridge 20 in one position of legs 41 bearing on stop 40 and the other pair adapted to be in alignment with rails 23 when the other legs 41 bears on stop 40. A pair of pullback guide rails 47 is placed between rails 43–44 beneath guide slot 48 and a pair of pullback guide rails 47a is provided between rails 45–46 beneath guide slot 49 (FIGS. 2 and 11). The stop 40 is moved in guides 41 by piston 50 in cylinder 51 (FIGS. 10 and 12). The springs 39 allow for variance between the position of the car and the shift rod 38 when the stops are effectively holding the car.

Figure 4:
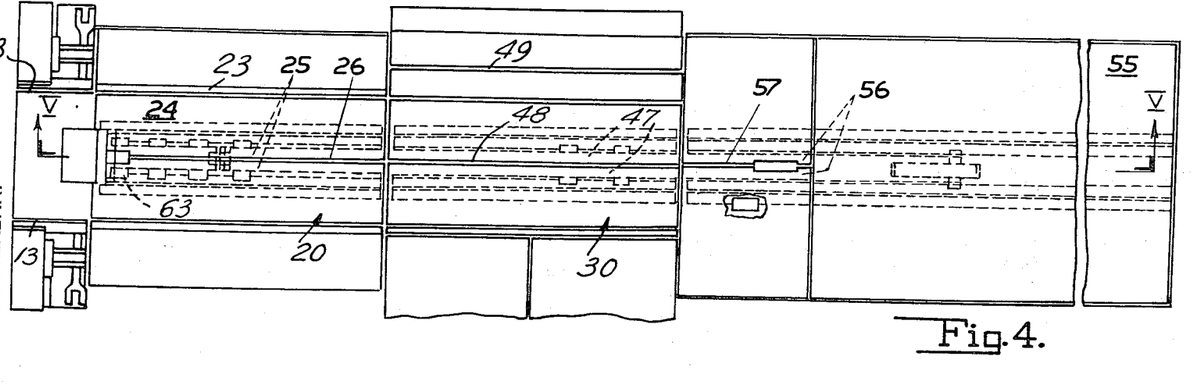
FIG. 4 is an enlarged fragmentary plan view of the roll changing rig of FIGS. 1–3.
Figure 18:
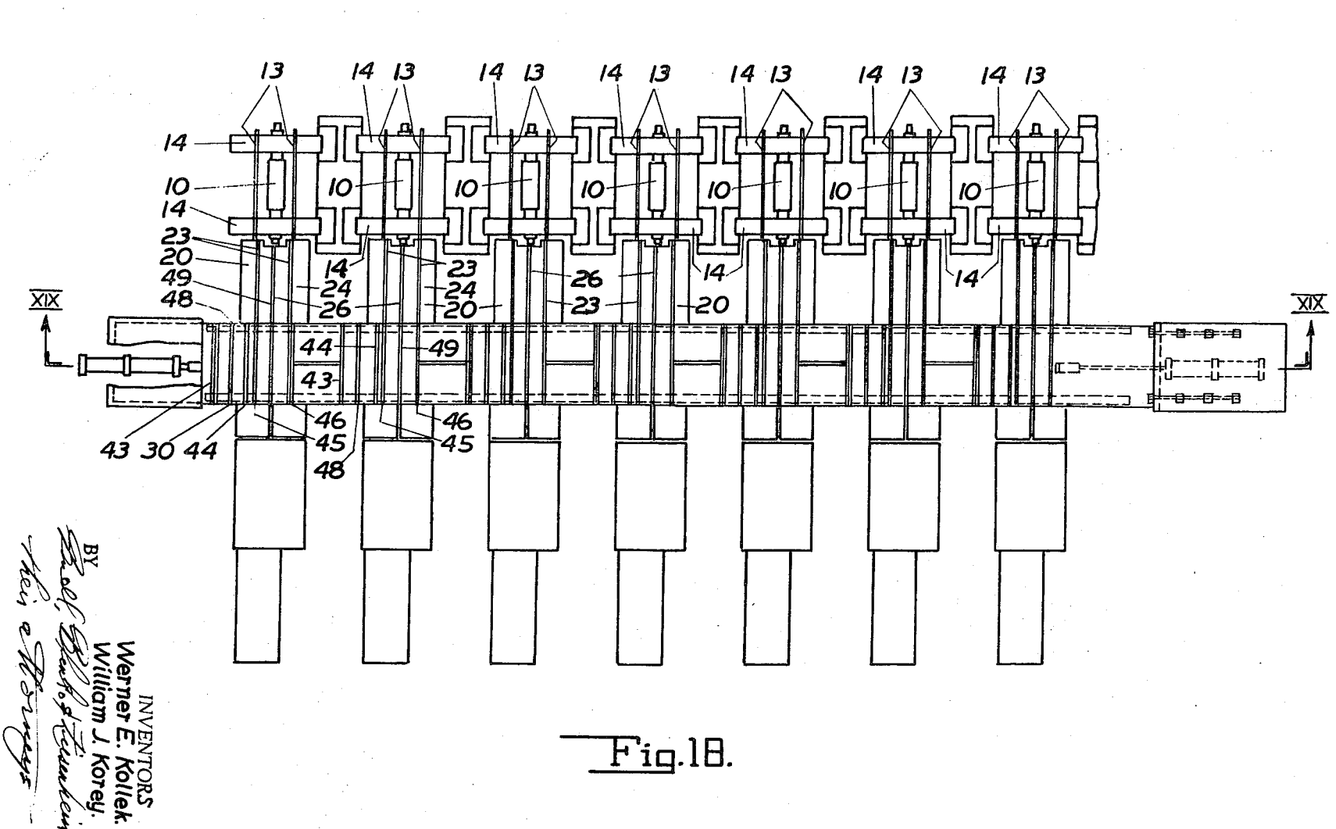
FIG. 18 is a top plan view of a tandem mill arrangement embodying our invention.

Spaced beyond both bridge 20 and shift car 30 is the main mill floor 55 which is provided with pullback guide rails 56 beneath and on opposite sides of slot 57 (FIGS. 4 and 18). The slot 57 and guide rails 56 are in alignment with slot 48 and guide rails 47 of the transfer bridge 20 (FIG. 4). A pinion 58 (FIG. 5) is placed beneath and between the pullback guide rails 56 to engage a rack 59 on the bottom of pullback rod 60. The pullback rod 60 is provided along its length with guide and support wheels 61. A latch member 62 supported on wheels 63 is articulated on the end of the pullback rod 60 at the end nearest the mill housing. The latch member 62 has a vertical neck 64 adapted to move through slots 26, 48, 49 and 57 and a grooved head 65 having a groove 66 adapted to engage a collar 67 on the end of the work rolls.

Figure 5:
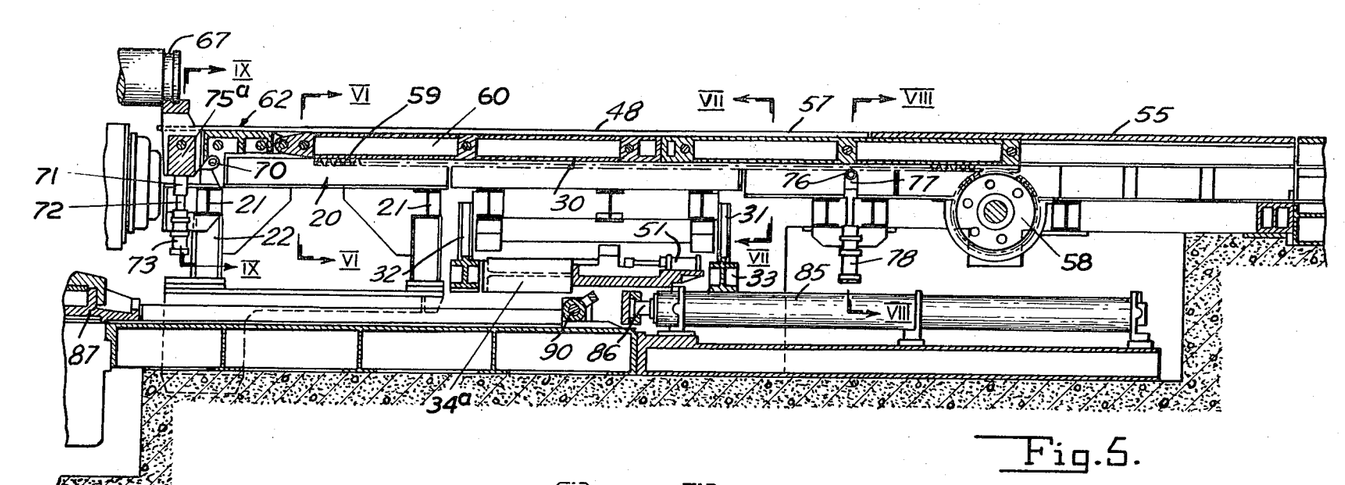
FIG. 5 is a section on the line V—V of FIG. 4.
Figure 6:
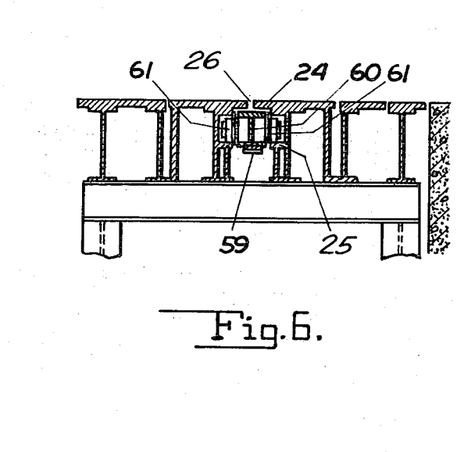
FIG. 6 is a section on the line VI—VI of FIG. 5.
Figures 8, 9, 14:
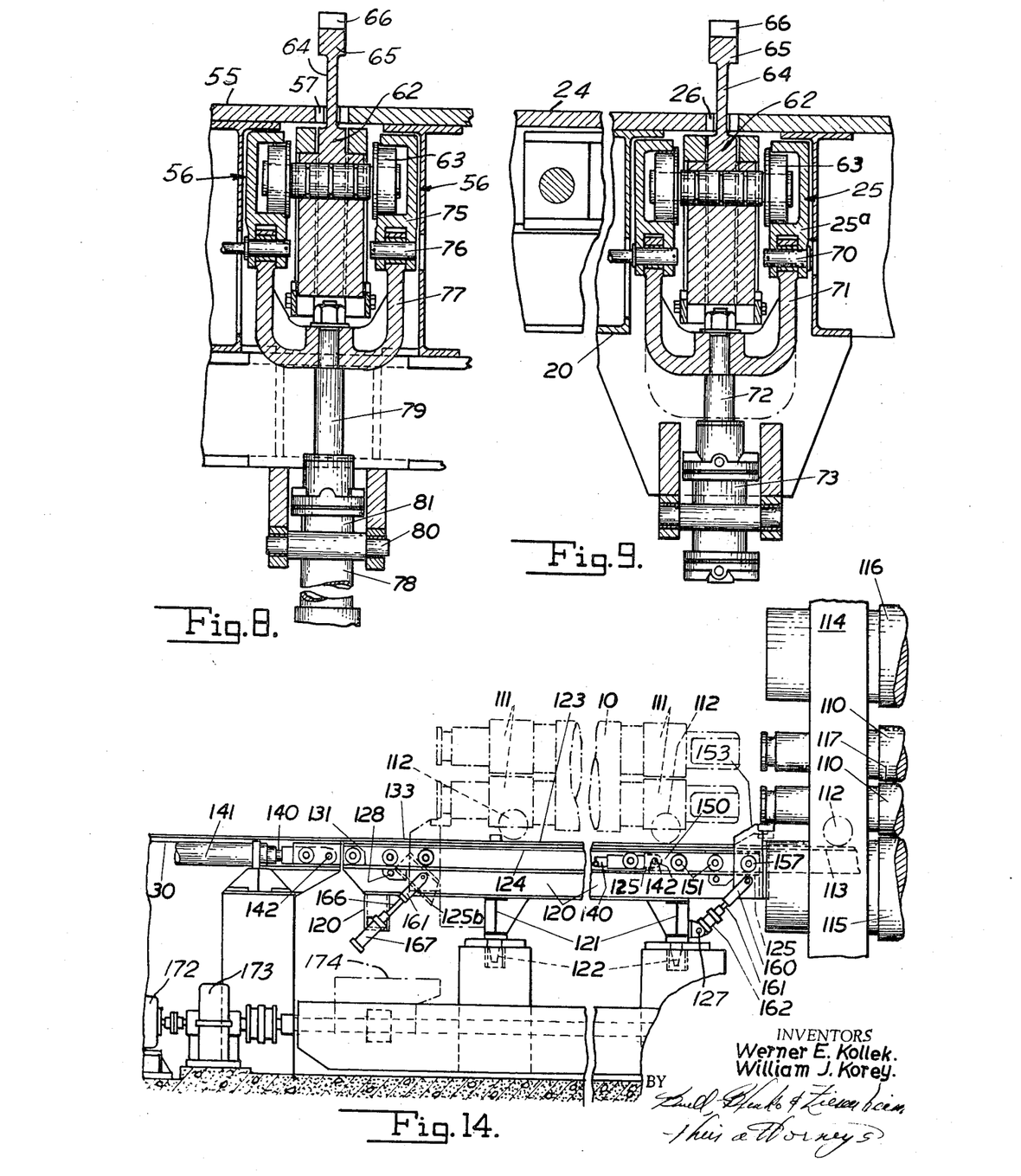
FIG. 8 is an enlarged fragmentary section on the line VIII—VIII of FIG. 5 showing the latch member when it is retracted to the position of this section.
FIG. 9 is an enlarged fragmentary section on the line IX—IX of FIG. 5.
FIG. 14 is a section on the line XIV—XIV of FIG. 13.

Referring to FIGS. 5 and 9 the roll transfer bridge 20 is provided with pivoted end portion 25a of guides 25 pivoted on shaft 70 at the one end and in a yoke 71 at the other. The yoke 71 is mounted on the end of piston 72 mounted in cylinder 73. The piston 72 is pivotally mounted in the frame of the roll transfer bridge 20.

Referring to FIG. 8 (wherein the latch member 62 is shown in its retracted position) a similar pivoted portion 75 is provided on guide rails 56 beneath the main floor 55 to pivot at one end on pin 76. The other end is pivotally mounted in yoke 77 on piston 78 in cylinder 79 pivoted on trunnions 80 in the frame 81 supporting the main floor 55.

Beneath the main floor 55 there is provided a cylinder 85 (FIG. 12) having a piston 86 extendable beneath the rails 33-34 for the shift car to the sled 87 (FIGS. 3 and 5) carrying the chocks 88 for the bottom back up roll.

A T-latch 89 (FIG. 12) is provided on the end of piston 86 rotatable about pin 90 into engagement with keyhole slot 91 in the sled 87. When the roll transfer bridge 20 is removed, the piston 86 can be extended and latch 89 engaged in slot 91 to pull the sled and bottom back up roll into the area previously occupied by bridge 20. The back up roll is lifted out by an overhead crane or the like.

The roll changer described above operates in the following manner. Assuming the work rolls 10 in mill housing 14 are to be changed, the shift car 30 is moved to align one set of the spaced rails 43–44 or 45–46 with the rails 23 on the transfer bridge 20 and rails 13 in the mill housing 14, which rails have been raised to free the work rolls from the lower back up roll. The pullback rod 60 is moved toward the mill housing (from right to left as viewed in FIGS. 3 to 5) in guide rails 25, 47 (or 47a) and 56 (FIG. 4) until the latch member wheels 63 enter the pivoted end portion 25a of guide rail 25 as shown in FIG. 9 at which time the end portion 25a is lowered by piston 72 to permit the latch to pass below collar 67 on the work rolls. The end 25a is then raised by piston 72 and yoke 71 to the level of guide rails 25 thus engaging latch head 65 on collar 67 as shown in FIGS. 3 and 5. The pullback rod is then withdrawn through guide rails 25, 47 (or 47a) and 56 pulling the work rolls therewith until the work roll wheels 12 rest on the previously aligned rails 43–44 or 45–46 as the case may be. At this point the wheels 63 of latch member 62 are at rest in pivoted portion 75 as shown in FIG. 8. This portion 75 is then lowered about pivot pin 76 to lower the latch member 62 out of engagement with collar 67 on the work rolls. The shift car 30 is then moved to align a new set of work rolls on the other set of rails 43–44 or 45–46 and the steps are repeated to move the new set of rolls onto rails 13 in the mill housing 14.

In the embodiment illustrated in FIGS. 13–17, we have illustrated a pair of work rolls 110 journalled in chocks 111 mounted on wheels 112 resting on rails 113 in mill housing 114, exactly as in the embodiment of FIGS. 1–12. The rails 113 may be raised and lowered in the housing 114 to lift the work rolls 110 off the bottom back up roll 115 as in FIG. 1. The upper back up roll 116 may be raised to clear the work rolls by means of the screw domes which are conventional on such mills.

Figures 13, 16, 17:
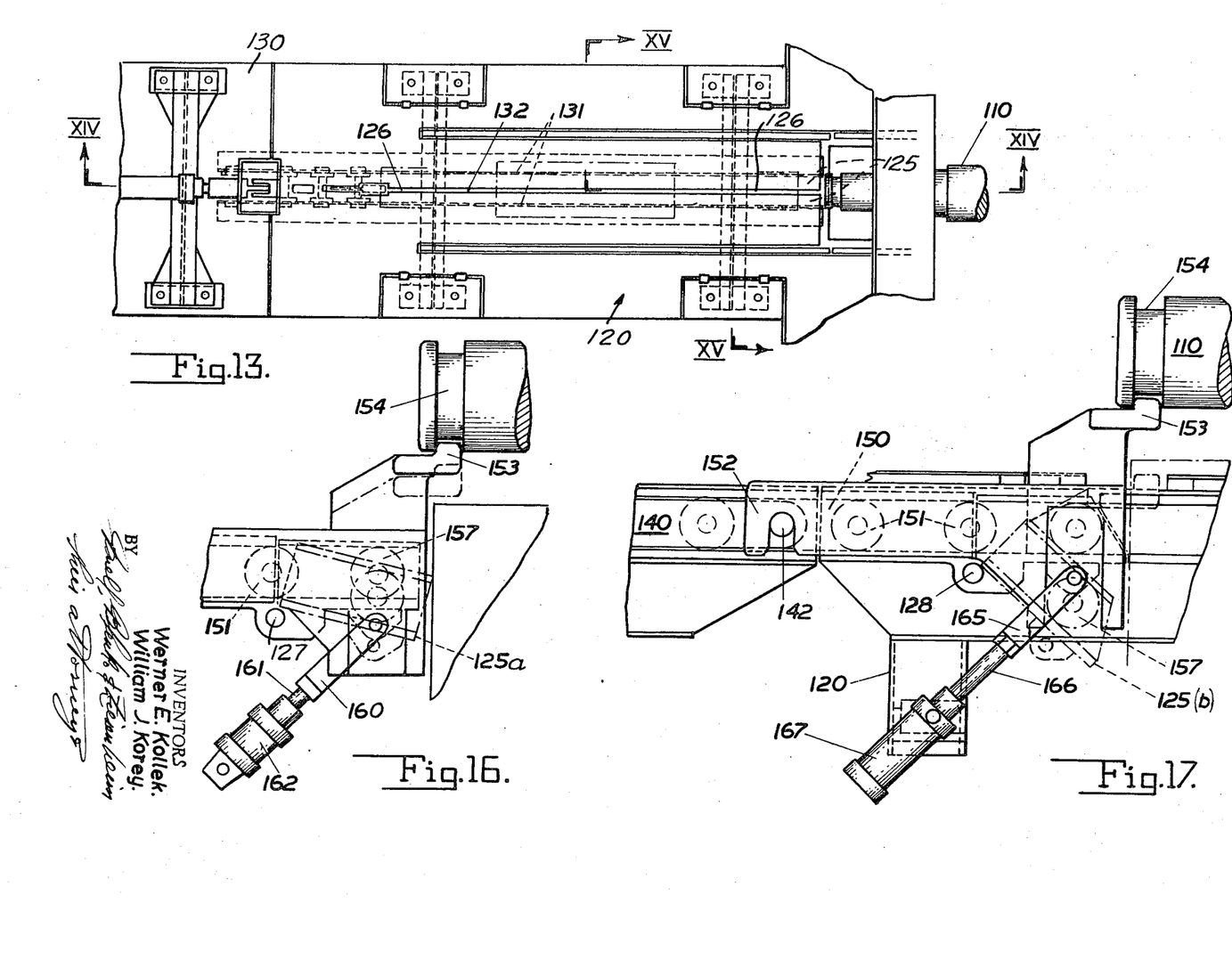
FIG. 13 is a top plan view of a second embodiment of roll changing rig according to our invention.
FIG. 16 is an enlarged fragmentary side elevation of the forward cylinder and latch guide of FIG. 13.
FIG. 17 is an enlarged fragmentary side elevation of the rear cylinder and latch guide of FIG. 13.

A removable roll transfer bridge 120 having depending legs 121 adapted to engage vertical dowels 122 is provided adjacent the housing 114. Rails 123 on the bridge floor 124 are in alignment with the elevated position of rails 113 in the housing. Centered between the rails 123 and beneath floor 124 are spaced pullback guide rails 125 on either side of a slot 126 in floor 124. The bridge 120 may be removed and replaced from dowels 122, by lifting it vertically by means of an overhead crane or the like.

Spaced alongside bridge 120 is the main mill floor 130 which is provided with pullback guide rails 131 beneath and on opposite sides of slot 132. The slot 132 and rails 131 are in alignment with pullback guide rails 125 and slot 126 on the bridge as shown in FIG. 13. A pullback rod 140 is mounted in and operated by hydraulic cylinder 141 between guide rails 132 in slot 126. Rails 133 are provided on the main floor in alignment with rails 123 on the bridge floor to receive wheels 112 carrying chocks 111.

The pullback rod 140 is provided wth horizontal trunnions 142 at the end remote from hydraulic cylinder 141. A latch buggy 150 (shown in detail in FIG. 17) is mounted on wheels 151 for movement in rails 125. The latch buggy is provided at one end with hooks 152 which removably engage trunnions 142 on pullback rod 140. At the opposite end of the latch buggy there is provided latch means 153 adapted to engage a groove 154 in work roll 110. The latch means 153 is pivoted on shaft 156 in buggy 150 and is mounted on wheels 157.

The forward end 125a of guide rails 125 is articulated on shaft 127 on the bridge 120 as shown in FIG. 16. The end 125a is pivoted in yoke 160 on piston 161 in cylinder 162 mounted in bridge 120 adjacent the mill housing. Movement of piston 161 raises and lowers the end 125a of guide rails 125 around shaft 127 thereby raising the latch means 153 into engagement with groove 154. The opposite or rear end 125b of guide rails 125 is also articulated on shaft 128 on bridge 120 as shown in FIG. 17. The opposite end 125b is pivoted in yoke 165 on the end of piston 166 in cylinder 167 mounted on bridge 120 remote from the mill housing.

The operation of the embodiment illustrated in FIGS. 13–17 is as follows. The pullback rod 140 is moved in rails 131 and 125 to the right as viewed in FIGS. 13 and 14 to push the latch buggy 150 toward the work rolls 110 in the mill housing 114 until the wheels 157 enter the rail end 125a. The rail end 125a is lowered by cylinder 162 withdrawing piston 161 from its extended position, thus causing the latch means 153 to drop beneath the level of the work rolls. When the wheels 157 reach the end of their travel in rail end 125a as shown in FIG. 16, the cylinder 162 is energized to raise the latch means into groove 154 in work roll 110. The pullback rod 140 is then retracted to draw the work rolls on wheels 112 from their position on rails 113 onto rails 133 or the bridge 120. When the work rolls are completely on bridge 120, the wheels 157 of the latch means are in rail end 125b as shown in FIG. 17. The rail end 125b is lowered by piston 166 and cylinder 167 to release the work rolls for removal from bridge 120. If it is desired to remove the lower back up roll, the bridge 120 is lifted from its position by an overhead crane or other suitable means. When the bridge 120 is removed, the latch buggy is removed with the bridge, the lowered end 125b holding the buggy while the hooks 152 are lifted free of trunnions 142 on the pullback rod. Referring to FIG. 14, the lower back up roll is then withdrawn from the mill housing on rails 170 by means of screw 171 driven by motor 172 through gear reducer 173. The screw 171 threadingly engages the sled 174 which supports the lower back up roll, the sled being shown in dotted lines in its withdrawn position in FIG. 14.

Figure 19:
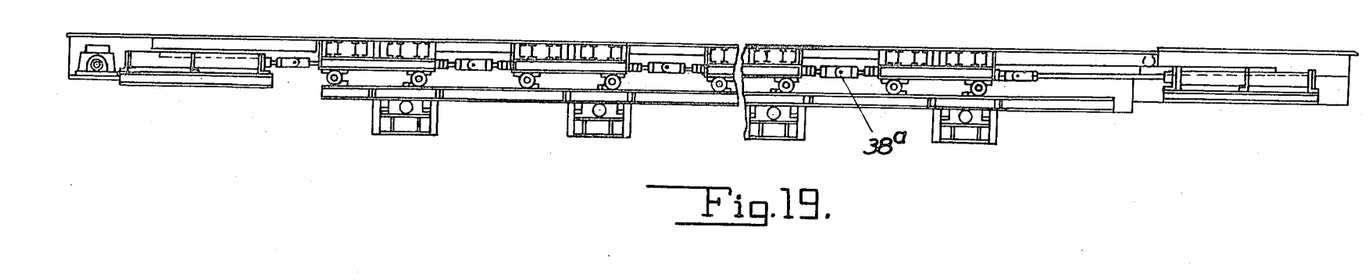
FIG. 19 is a section on the line XIX—XIX of FIG. 18.

In FIGS. 18 and 19 we have shown an arrangement for simultaneously changing all the rolls of a tandem rolling mill having a plurality of roll stands with rolls. Each roll stand is provided with a roll changing mechanism identical with that of FIGS. 1–17 and bearing identical numbers. In these figures, the shaft car 30 for each mill is connected to the next succeeding car through a connector 38a connecting the respective spring loaded shift rods 38 in each car. Each car is positioned in front of its appropriate mill by stops 34a and 40 as described in connection with the previous figures.

While we have shown and described presently preferred embodiments of our invention, and have illustrated presently preferred methods of practicing the same, it is to be understood that this invention may be otherwise embodied within the scope of the following claims.

We claim:

1. In a rolling mill having a mill housing surrounding a pass line, a window in each end of the housing, each receiving a pair of superimposed roll chocks having work rolls journalled therein, the improvement comprising a pair of spaced rails in said windows extending from one side of the housing to the other, raising means to lift said rails, wheel means on the roll chocks bearing on said spaced rails to carry the rolls into and out of the housing, a roll transfer bridge adjacent the housing, spaced rails on said bridge in alignment with the rails in said housing, a side shift car at the end of said bridge opposite the housing, said side shift car having a plurality of sets of spaced rails each capable of selective alignment with said bridge rails, means for moving said side shift car parallel to the mill pass line, stop means selectively positioning said rails at the mill housing window, guide means on each of said bridge and said car, a floor housing guide means adjacent said car opposite the bridge and in permanent alignment with the guide means on the bidge, a pull rod movable in said guide means, a vertically movable end latch articulated on the end of said pull rod and adapted to move in said guide means with said pull rod, an articulated end portion on the transfer bridge guide means adjacent the mill housing, an articulated end portion on the end of the floor housing guide means adjacent the shift car, means at each of the said articulated portions for moving said portions around their respective articulations, said articulated end portions engaging the end latch to raise and lower it selectively into and out of engagement with a set of rolls to be changed and means for moving said pull rod transversely to the mill pass line.

2. In a rolling mill having a mill housing surrounding a pass line, a window in each end of the housing, each receiving a pair of superimposed roll chocks having work rolls journalled therein, the improvement comprising a pair of spaced rails in said windows extending from one side of the housing to the other, wheel means on the roll chocks bearing on said spaced rails to carry the rolls into and out of the housing, a removable roll transfer bridge adjacent the housing, spaced rails on said bridge in alignment with the rails in said housing, guide means on said bridge, a floor housing guide means adjacent said bridge and in permanent alignment with the guide means on the bridge, a pull rod movable in said guide means, a vertically movable end latch articulated on the end of said pull rod and adapted to move in said guide means with said pull rod, an articulated end portion on the transfer bridge guide means adjacent the mill housing, a second articulated end portion on the transfer bridge guide means adjacent the floor housing guide means, means at each of the said articulated portions for moving said portions around their respective articulations, said articulated end portions engaging the end latch to raise and lower it selectively into and out of engagement with a set of rolls to be changed and means for moving said pull rod transversely to the mill pass line.

3. A rolling mill apparatus as claimed in claim 2 wherein the latch means is removable from the pull rod when said latch means is in the second articulated end portion.

4. In a tandem rolling mill having a plurality of spaced mill housings surrounding a pass line, a window in each end of each housing, each receiving a pair of superimposed roll chocks having work rolls journalled therein, the improvement comprising a pair of spaced rails in each of said windows extending from one side of the housing to the other, raising means to lift said rails, wheel means on the roll chocks bearing on said spaced rails to carry the rolls into and out of the housing, a roll transfer bridge adjacent each housing, spaced rails on each said bridge in alignment with the rails in said housing, a side shift car at the end of each said bridge opposite the housing, each of said side shift cars having a plurality of sets of spaced rails each capable of selective alignment with said adjacent bridge rails, means for moving said side shift cars parallel to the mill pass line as a unit, stop means selectively positioning each said car with a set of said rails at the mill housing window, guide means on each of said bridge and said car, a floor housing guide means adjacent each said car opposite each bridge and in permanent alignment with the guide means on each said bridge, a pull rod movable in each of said guide means, a vertically movable end latch articulated on the end of each of said pull rods and adapted to move in said guide means with said pull rods, an articulated end portion on each transfer bridge, guide means adjacent each mill housing, an articulated end portion on the end of the floor housing, guide means adjacent each shift car, means at each of the said articulated portions for moving said portions around their respective articulations, said articulated end portions engaging the end latch to raise and lower it selectively into and out of engagement with a set of rolls to be changed and means for moving said pull rod transversely to the mill pass line.

5. An apparatus as claimed in claim 4 wherein each shift car is provided with a resilient connection to the means for moving said side shift cars parallel to the mill pass line and the stop acts to locate each said car at a selected mill stand in cooperation with the resilient means.

6. An apparatus as claimed in claim 5 wherein the resilient means is a spring.

7. An apparatus as claimed in claim 5 wherein the stop means is a fixed stop adjacent each mill stand engaging a first stop projection on each shift car and a movable stop spaced from each fixed stop engaging a second stop projection on each shift car whereby the car is held between said fixed and movable stops.

8. A rolling mill comprising a mill housing surrounding a pass line, a window in each end of said housing arranged to receive a pair of superimposed work roll chocks having work rolls journalled therein, roll transfer means including a removable transfer bridge alignable with the work rolls and work roll chocks in said housing, first guide means on said bridge, second guide means within said housing, said first guide means being, in a roll transfer position, aligned with said second guide means, said first guide means being vertically displaceable within the housing for movement into and out of alignment with said second guide means, and a roller pull assembly displaceable in a direction across said bridge towards and away from the mill housing and being operable to engage the rolls, said rolls being mounted on wheels for movement on said first and second guide means, to transfer said rolls from the housing on to the bridge and vice versa, further guide means provided in alignment respectively on the bridge and on the apparatus floor on the side of the bridge remote from the housing, said roller pull assembly being in the form of a rod having a vertically movable end latch articulated on the roll engaging end thereof and adapted to move in said further guide means with said pull rod, and said latch being selectively movable into and out of engagement with the rolls by a first articulated end portion on said transfer bridge guide means adjacent the mill housing and a second articulated end portion on the opposite end of said transfer bridge guide means adjacent the apparatus floor, and control members at each of the said articulated end portions for moving said portions around their respective articulations to raise and lower said latch as desired.

9. A rolling mill as claimed in claim 8 wherein said latch is removable from said pull rod.

10. A rolling mill as claimed in claim 8, including a side shift car provided at the end of said bridge adjacent the housing, said side shift car having a plurality of sets of spaced rails each capable of selective alignment with said bridge guide means, drive members for moving said side shift car parallel to the mill pass line and stop members for selectively positioning said rails at the mill housing window, whereby rolls can be transferred from the housing on to the side shift car for removal to another location and vice versa.

11. A rolling mill as claimed in claim 10, including guide means in the shift car, said guide means on each of the bridge and the apparatus floor and said last-mentioned guide means on the side shift car being spaced apart channels opening toward each other to form spaced enclosed tracks.

12. A rolling mill as claimed in claim 11 wherein the vertically movable end latch is provided with wheels on opposite sides engaged in said spaced apart channels.

13. A rolling mill as claimed in claim 12 wherein the pull rod is provided with wheels on opposite sides engaged in said spaced apart channels.

14. A rolling mill as claimed in claim 10 wherein the control members for moving said articulated end portions around their respective articulations include hydraulic cylinders.

15. A rolling mill as claimed in claim 8 wherein the roll transfer bridge is removably mounted on vertical guidepins.

16. A rolling mill according to claim 10 comprising a plurality of the rolling mill means claimed therein arranged in tandem with the mill housings thereof aligned to surround a pass line, and wherein each of the side shift cars is movable as a unit parallel to the pass line into and out of the respective roll transfer positions.

17. A rolling mill as claimed in claim 16, wherein each shift car is provided with a resilient connection to the adjacent car and hence to the drive members for moving said side shift cars parallel to the mill pass line, and the stop members are operable to locate each said car at a selected mill stand in cooperation with the resilient connections.

18. A rolling mill as claimed in claim 17 the stops include a fixed stop located adjacent each mill stand to engage a first stop projection on each shift car, and a movable stop spaced from each fixed stop and arranged to engage a second stop projection on each shift car in such manner that said car is held between said fixed and movable stops.

References Cited

UNITED STATES PATENTS

| | | | |
|---|---|---|---|
| 3,208,260 | 9/1965 | Sieger et al. | 72—239 |
| 3,221,530 | 12/1965 | Swallow et al. | 72—238 |
| 3,312,096 | 4/1967 | Stubbs et al. | 72—238 |
| 3,323,345 | 6/1967 | Lyle et al. | 72—239 |
| 3,376,724 | 4/1968 | Wolfendale et al. | 72—239 |

CHARLES W. LANHAM, Primary Examiner

B. J. MUSTAIKIS, Assistant Examiner